(No Model.) 2 Sheets—Sheet 1.

C. LETOT.
COTTON AND CORN PLANTER.

No. 410,904. Patented Sept. 10, 1889.

ATTEST.
J. Henry Kaiser.
Victor J. Evans.

INVENTOR.
Clement Letot

N. PETERS, Photo-Lithographer, Washington, D. C.

(No Model.) 2 Sheets—Sheet 2.
C. LETOT.
COTTON AND CORN PLANTER.
No. 410,904. Patented Sept. 10, 1889.
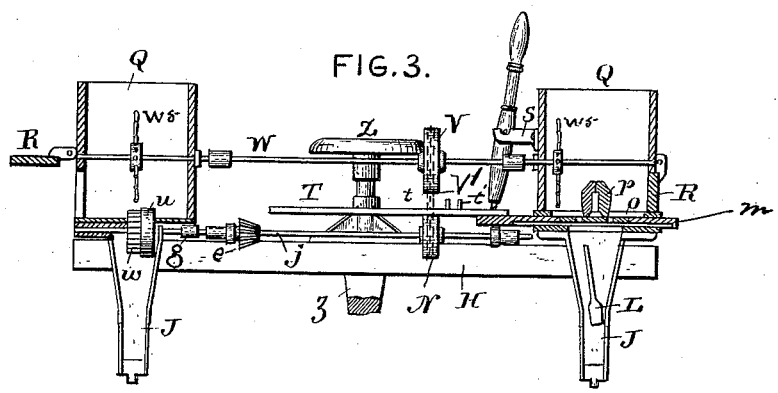
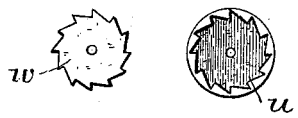
FIG. 4.
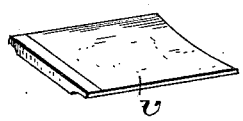
FIG. 7.
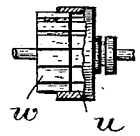
FIG. 5.
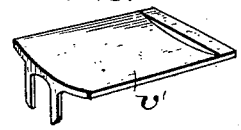
FIG. 6.
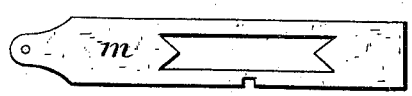
FIG. 8.
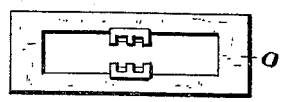
FIG. 10.
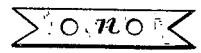
FIG. 9.
FIG. 11.
FIG. 12.
ATTEST.
J. Henry Kaiser.
Victor J. Evans.
INVENTOR.
Clement Letot

UNITED STATES PATENT OFFICE.

CLEMENT LETOT, OF LETOT STATION, TEXAS.

COTTON AND CORN PLANTER.

SPECIFICATION forming part of Letters Patent No. 410,904, dated September 10, 1889.

Application filed October 8, 1888. Serial No. 287,569. (No model.)

*To all whom it may concern:*

Be it known that I, CLEMENT LETOT, a citizen of the United States, residing at Letot Station, in the county of Dallas and State of Texas, have invented new and useful Improvements in Cotton and Corn Planters, of which the following is a specification.

My invention relates to improvements in planters especially adapted for planting corn and cotton; and the leading object of the invention is the production of a durable and inexpensive planter which will serve to plant both corn and cotton in a perfect manner, and thus combine the two machines in one.

To attain the desired object the invention consists of a planter constructed as illustrated, described, and claimed herein.

Figure 1:
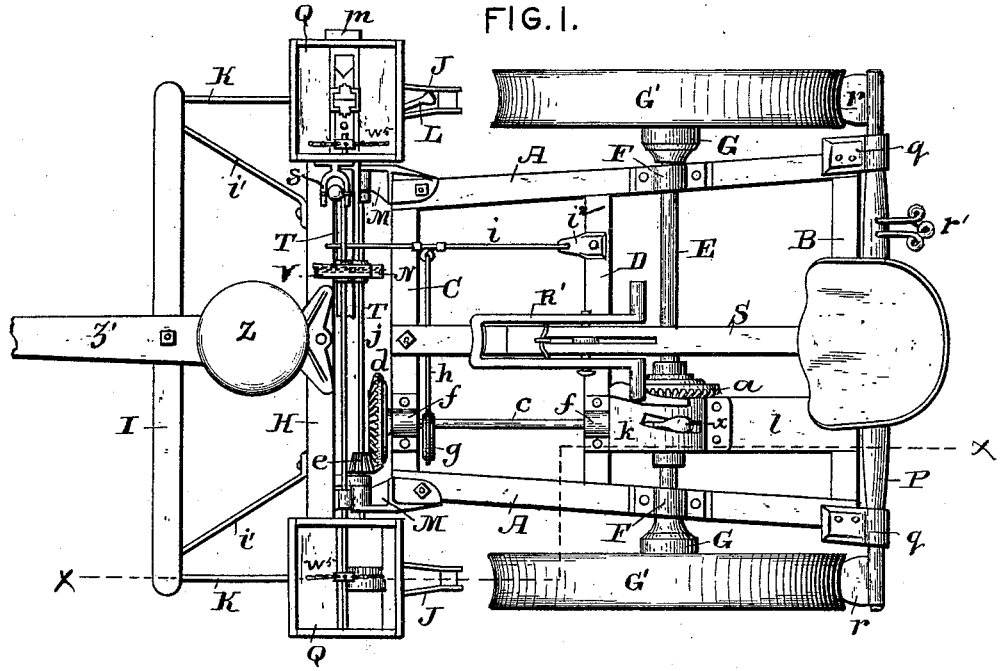
Figure 2:
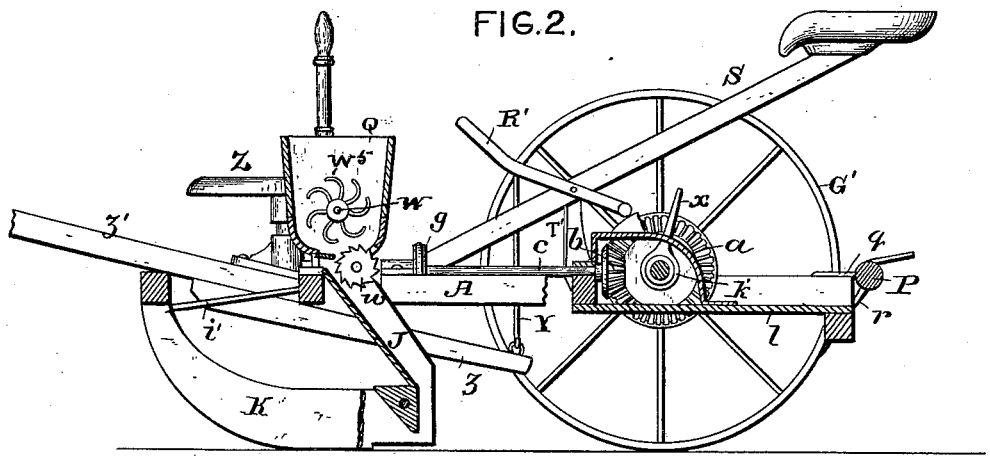

Figure 1 represents a plan view of a planter embodying my invention. Fig. 2 represents a sectional view on line $x$ $x$ of Fig. 1. Fig. 3 represents a transverse sectional view taken through the hoppers of the machine. Figs. 4, 5, 6, 7, 8, 9, 10, 11, and 12 are detail views of parts of the machine.

Referring by letter to the drawings, similar letters of reference denote corresponding parts in all of said figures.

The frame of the machine consists of the side rails A and transverse connecting-rails B, C, and D. In the frame is mounted the axle E, boxes F being provided for said axle, and on the axle are the clutch-collars G and supporting-wheels G′.

H and I designate cross-bars connected together by rods $i'$, and connected to the cross-bar H at each end thereof are the chutes J, and connected with the cross-bar I and said chutes J are the furrow-openers K. In one of the chutes J is placed a valve L. The cross-bar H is flexibly connected to the main frame by means of hinges M.

On the axle is mounted a bevel gear-wheel $a$, formed with a sleeve K′, adapted to be slid or moved on said axle by means of a lever X.

Meshing with the gear-wheel $a$ is a gear-wheel $b$, mounted on a shaft $c$, journaled in boxes $f$, secured to the frame, and this shaft carries a bevel gear-wheel $d$, which meshes with a pinion $e$, mounted on a shaft $j$, and connected with one end of the shaft $j$ is a toothed wheel $w$, arranged in a collar $u$.

Q Q designate the seed-hoppers, arranged above the seed-chutes, having doors R for removing obstacles from the hoppers.

In the hoppers is mounted a shaft W, having stirrers or agitators $w^5$ mounted thereon and arranged in the hoppers, and on this shaft W is also mounted a sprocket-wheel V, over which and a sprocket-wheel N on shaft J passes a sprocket-chain V′. From this construction it will be seen that the rotation of shaft $j$ through the medium described rotates shaft W, and consequently the agitators thereon.

On the shaft $c$ is an eccentric $g$, with which is connected one end of a rod $h$, the other end of said rod being connected to a lever $i$, pivoted at its inner end to a plate $i^2$, secured to the frame, and having its other end engaging lugs $t'$ on a rod T, and to said rod T is connected the seed-slide $m$, having the slot therein to receive the plate $n$, provided with openings, and the slide $m$ is guided by the plate O, and over the slide $m$ are placed the cut-offs $p$.

From the foregoing description, taken in connection with the drawings, it will be seen that the rotation of the shaft $c$ imparts motion to shaft $j$ and rotates the drill-wheel $w$ connected therewith, and that simultaneous therewith the eccentric on said shaft moves the lever $i$ back and forth, imparting motion to the seed-slide, thus enabling the machine to simultaneously plant corn and cotton.

Secured to the frame is a plate, and connected with the plate and frame is a sheath or cover $k$.

S designates the seat-supporting bar.

R′ designates a foot-lever, pivoted on the seat-supporting bar S, and connected with the bar $z$ by a rod Y, and the bar $z$ is connected with a bar $z'$, and by pressing on the lever R′ the furrow-openers $k'$ will be raised from the ground.

Z designates a dropper's seat mounted on the bar $z'$.

To the rear of the machine in boxes $q$ is pivoted the shaft P, carrying scrapers $r$, and on said shaft P is a treadle $r'$, for pressing the scrapers in contact with the supporting-wheels for removing accumulations.

I have described the parts comprising my planter, and I will now briefly state the operation thereof.

Cotton and corn are placed in the hoppers, and the driving-gear on the axle is thrown into gear with the small gear $b$ on shaft $c$, the machine now being ready for operation. The machine is moved along the ground, the runners or furrow-openers opening the ground, the agitators in the hopper are rotated, and the slide in the hopper on one side and the toothed or drilling wheel in the other hopper are operated by the mechanism described simultaneously, and the machine thus in one operation plants corn and cotton, as will be readily understood.

When the machine is not to be used, the driving-gear is thrown out of gear with the operating mechanism.

The advantages of my machine will be readily understood and appreciated by all skilled in the art.

Having thus fully described my invention, what I claim as new, and desire to secure by Letters Patent of the United States, is—

1. In a combined cotton and corn planter, the combination of the frame, the axle mounted therein, the shifting bevel-gear $a$, the lever $x$, for shifting said gear, the pinion $b$, meshing with said gear, the driving-shaft $c$, carrying said pinion, the gear-wheel $d$ on said shaft, the pinion $e$, meshing with said gear-wheel, the shaft $j$, carrying the said pinion and also toothed wheel $w$, the sprocket-wheel N on said shaft, the shaft W, carrying the agitators $w^5$ and sprocket-wheel V, the sprocket-chain V', passing over said sprocket-wheels N V, the eccentric $g$ on the driving-shaft, the rod $h$, connected to said eccentric, the lever $i$, connected to said rods, and the plate T, carrying the slide $m$, adapted to be reciprocated by said lever $i$, all of said parts being arranged and operating substantially as and for the purpose described.

2. In a combined cotton and corn planter, the combination of the driving-gear $a$, the shaft $c$, carrying the gear-wheels $b$ and $d$, operated by the gear $a$, the shafts $j$, carrying the pinion $e$ and toothed wheel $w$, the shaft W, carrying the agitators $w^5$, the sprocket-wheels N and V on said shafts, the eccentric $g$ on the driving-shaft, the rod $h$, connected to said eccentrics, the lever $i$, connected to said rod, and the slide $m$, operated by said lever, substantially as and for the purpose described.

3. In a planter, the combination of the frame, the cross-bars H and I, hinged thereto, the hoppers Q, mounted on said bars, the transverse shaft W, carrying the agitators $w^5$, mounted in the hoppers, the transverse shaft $j$, carrying the toothed wheel $w$ and pinion $e$, the shaft $c$, carrying the gear-wheel $d$, meshing with said pinion, and the gear-wheel $d$, meshing with the driving-gear, the driving-gear $a$, the sprocket-wheels N and V, and the sprocket-chain V', passing over said sprocket-wheels, substantially as and for the purpose described.

4. In a planter, the combination of the driving-gear $a$, the driving-shaft $c$, having the gear $b$, meshing therewith, the eccentric $g$ on the driving-shaft, the rod $h$, connected to said eccentric, the lever $i$, connected to the rod, the plate T, adapted to be engaged by said lever, the slide $m$, connected to said plate T, the plate $o$, fitting in said slide $m$, and the cut-offs resting on the plate $o$, all arranged and operating substantially as and for the purpose described.

CLEMENT LETOT.

Witnesses:
S. K. WILLIAMSON,
DAVID LETOT.